(12) United States Patent
Miyazaki et al.

(10) Patent No.: US 7,152,644 B2
(45) Date of Patent: Dec. 26, 2006

(54) RUBBER REINFORCING STEEL CORD, MANUFACTURING METHOD OF RUBBER REINFORCING STEEL CORD AND PNEUMATIC TIRE

(75) Inventors: Shinichi Miyazaki, Kobe (JP); Osamu Toda, Kobe (JP); Yasuo Sakai, Utsunomiya (JP)

(73) Assignees: Sumitomo Rubber Industries, Ltd., Kobe (JP); Sumitomo Electric Industries, Ltd., Osaka (JP)

( * ) Notice: Subject to any disclaimer, the term of this patent is extended or adjusted under 35 U.S.C. 154(b) by 187 days.

(21) Appl. No.: 10/157,995

(22) Filed: May 31, 2002

(65) Prior Publication Data
US 2002/0189735 A1    Dec. 19, 2002

(30) Foreign Application Priority Data
Jun. 1, 2001    (JP)    ............... 2001-166262

(51) Int. Cl.
B60C 9/00    (2006.01)
D07B 1/06    (2006.01)

(52) U.S. Cl. .............. 152/451; 57/902; 57/295; 72/42; 72/274; 152/565; 428/624; 428/676; 428/380; 428/389

(58) Field of Classification Search ............. 428/621, 428/624, 625, 668, 676, 379, 380, 389; 152/451, 152/565; 57/295, 902; 72/42, 274
See application file for complete search history.

(56) References Cited

U.S. PATENT DOCUMENTS 3,846,160 A    11/1974  Hirakawa et al.
5,118,367 A    6/1992   Starinshak
5,221,559 A    6/1993   Martigny et al.
6,372,697 B1 *  4/2002   Lorentz et al.
2002/0192489 A1 * 12/2002  Huang et al. ............... 428/625

FOREIGN PATENT DOCUMENTS

| CN | 1272871 A | 11/2000 |
| EP | 0 137 986 A1 * | 4/1985 |
| EP | 1 243 692 A2 | 9/2002 |
| GB | 2 076 320 A | 12/1981 |
| JP | 53-90454 | 8/1978 |
| JP | 62-78291 A | 4/1989 |
| JP | 1-153783 A | 6/1989 |
| JP | 4-11637 A | 1/1992 |
| JP | 6-49786 A | 2/1999 |
| WO | WO-99/55809 A1 * | 11/1999 |

OTHER PUBLICATIONS

Glossary of Terms Relating to Rubber and Rubber Technology, American Society for Testing and Materials, Baltimore, MD, 1972, p. 108.*

* cited by examiner

*Primary Examiner*—Adrienne C. Johnstone
(74) *Attorney, Agent, or Firm*—Birch, Stewart, Kolasch & Birch, LLP

(57) ABSTRACT

A method of manufacturing a rubber reinforcing steel cord is provided, wherein the steel cord has a steel wire plated with metal containing copper and having on its surface an oil layer containing a cobalt compound, and includes an application step in which the oil containing a cobalt compound is applied to the steel wire or a steel cord plated with metal containing copper, and a step of twisting the steel wires.

17 Claims, 3 Drawing Sheets

RUBBER REINFORCING STEEL CORD, MANUFACTURING METHOD OF RUBBER REINFORCING STEEL CORD AND PNEUMATIC TIRE

BACKGROUND OF THE INVENTION

1. Field of the Invention

The present invention relates to a rubber reinforcing steel cord, manufacturing method thereof and to a pneumatic tire, in which a cobalt compound is contained in oil to be applied to a surface of a steel wire plated with metal containing copper, to prevent degradation of rubber while maintaining adhesion with rubber and to improve durability of the tire while reducing cost.

2. Description of the Related Art

A steel cord used for reinforcing a rubber product such as tire must have good adhesion with rubber, in order to form a composite with rubber. Various techniques have been disclosed to attain sufficient adhesion in steel cord and rubber.

For example, Japanese Patent Laying-Open No. 6-49786 discloses a technique in which a steel wire forming the steel cord is coated with a lubricating oil, and a water absorbing polymer is introduced in the gap between each of the steel wires.

Japanese Patent Laying-Open No. 1-153783 discloses a technique in which a reaction mixture mainly containing a cobalt salt of organic carboxylic acid•boron metallic soap is applied to the steel cord.

Japanese Patent Laying-Open No. 4-11637 discloses a technique in which a cobalt metal salt, sulfur and a bismaleimide compound are contained in the rubber composition, and the surface of the steel cord is provided with a cobalt plating layer.

By the above described techniques, however, it has been difficult to ensure good adhesion between rubber and steel cord, and to provide an economical tire using the steel cord.

Therefore, a technique has been proposed in which the surface of the steel cord is brass-plated, while a cobalt metal salt or the like as an adhesion assisting agent is added to a rubber composition, and the two are adhered with each other.

The steel cord with brass plating, however, has problems such as rust gathered on the surface of the steel cord during transportation or during the steps of manufacturing tires, and degradation of adhesion with rubber resulting from oxidation and alteration of the plated surface.

Addition of a cobalt compound to rubber is disadvantageous in that molecular chain of rubber may possibly degrade in the unvulcanized state, and that the cost of addition is extremely high.

SUMMARY OF THE INVENTION

An object of the present invention is to provide a steel cord having improved adhesion with rubber, to provide manufacturing method of the steel cord, and to provide an economical tire using the steel cord.

In accordance with the present invention, the rubber reinforcing steel cord has a steel wire plated with metal containing copper, and having oil containing a cobalt compound applied to its surface.

In the rubber reinforcing steel cord according to the present invention, the oil is mineral oil.

The present invention further provides a method of manufacturing a rubber reinforcing steel cord, including the application step of applying oil containing a cobalt compound to a steel wire plated with metal containing copper, and the step of twisting the steel wires.

The present invention further provides a pneumatic tire using the rubber reinforcing steel cord as a reinforcing element.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The rubber reinforcing steel cord in accordance with the present invention includes, as a component, a steel wire plated with metal containing copper, and having its surface coated with oil containing a cobalt compound. As the metal plating containing copper, brass plating containing copper and the zinc is preferred. The plating, however, is not limited thereto, and nickel, cobalt or the like may be considered as other possible metal. The inventors have found that when an oil layer containing a cobalt compound is provided on a surface of a steel wire plated with metal containing copper and the steel wires thus prepared are twisted to form a steel cord, satisfactory adhesion characteristic between the steel cord and rubber can be ensured and the amount of use of expensive cobalt compound can be suppressed. Based on this finding, the present invention was made.

As the cobalt compound, cobalt salt of organic acids such as cobalt stearate, cobalt naphthenate, cobalt oleate, cobalt linoleate, or rosin cobalt may preferably be used. The cobalt salt of organic acid has good affinity with oil and rubber, and ensures good adhesion between the steel cord and the rubber.

Here, as the rubber, diene type rubber may be used. More specifically, natural rubber, polyisoprene rubber, butadiene rubber and styrene butadiene copolymer rubber may suitably be used. It is also possible to introduce an additive agent such as carbon black, silica, calcium carbonate, process oil, sulfur, vulcanization accelerator or an antioxidant, as needed.

A mineral oil may be used as the oil as a medium bearing cobalt compound, as the mineral oil has good affinity with rubber. Mineral oil such as naphthene process oil or aromatic process oil may suitably be used.

Preferable concentration of cobalt compound in the oil is 0.3 to 10 mass %. When the concentration of cobalt compound is lower than 0.3 mass %, adhesion strength between steel cord and rubber becomes weak, and when the concentration of cobalt compound exceeds 10 mass %, manufacturing cost increases, as the content of cobalt compound increases.

Figure 1:
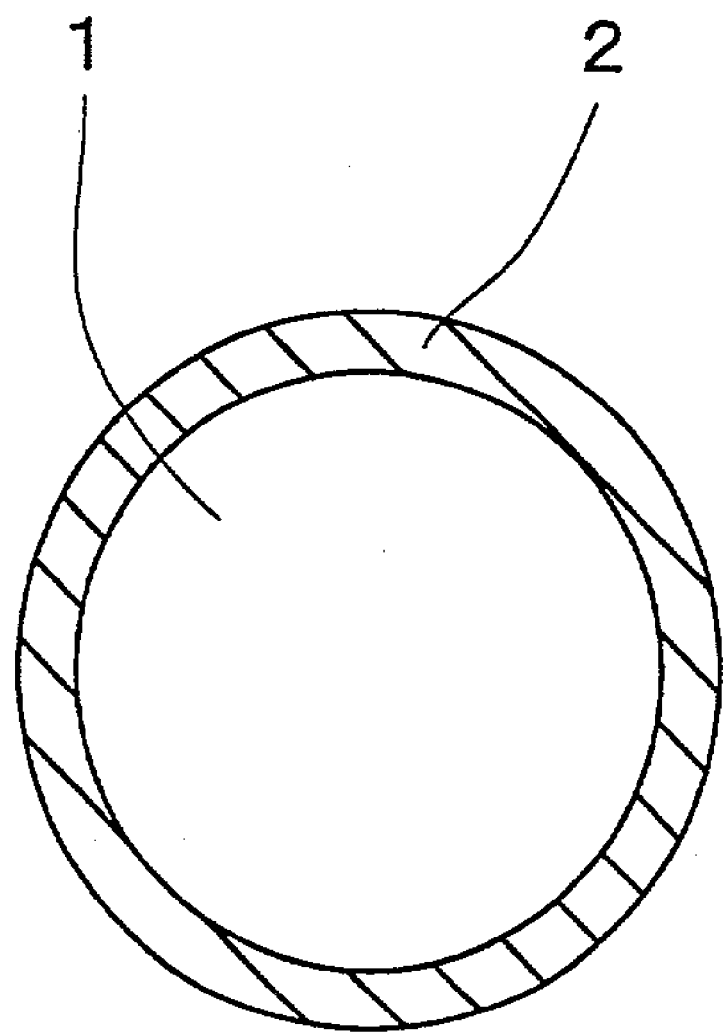
FIG. 1 is a cross sectional view of the steel wire in accordance with the present invention.

FIG. 1 is a cross sectional view of a steel wire forming the rubber reinforcing steel cord of the present invention. An oil layer 2 is provided on an outer circumferential surface of steel wire 1.

Figure 2:
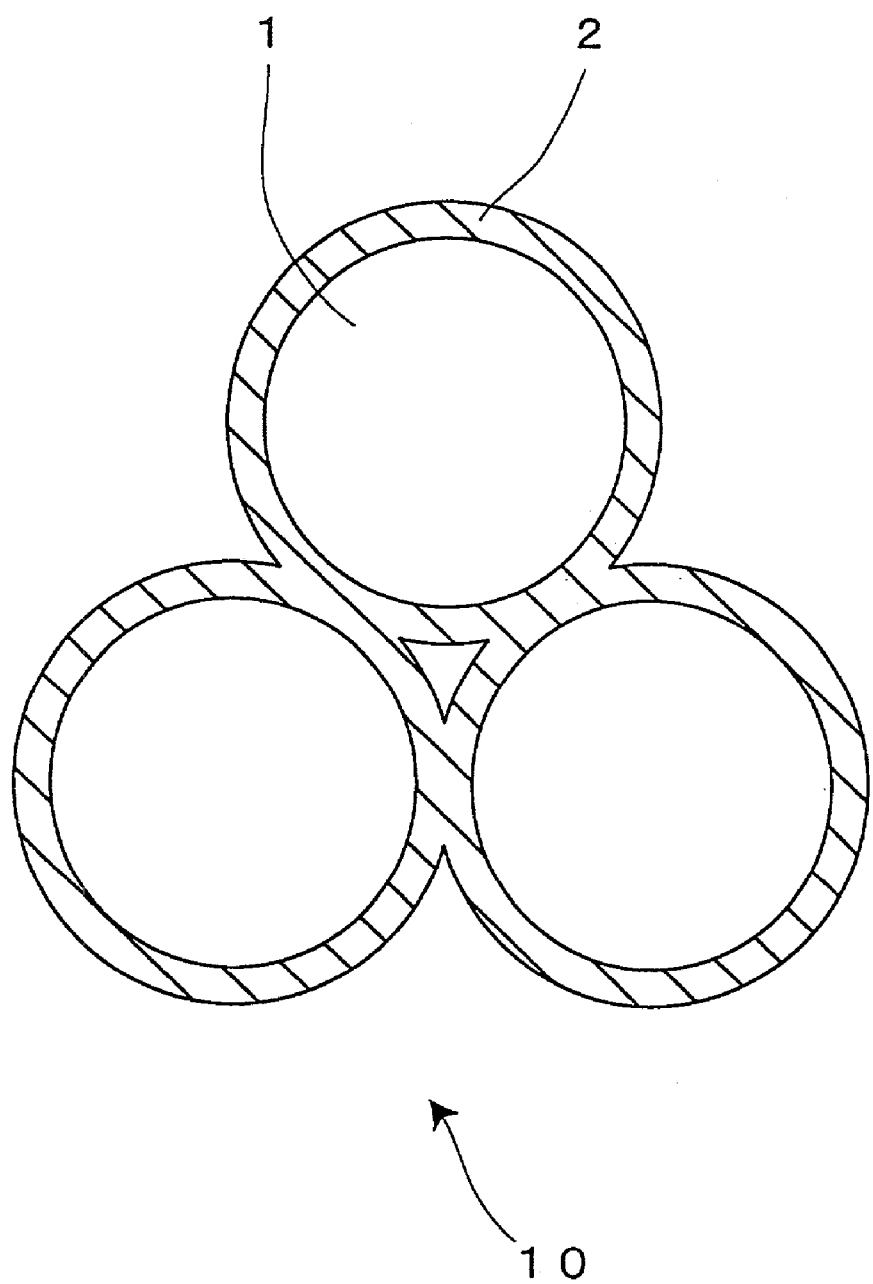
FIG. 2 is a cross sectional view of the steel cord in accordance with the present invention.

FIG. 2 shows a cross section of the rubber reinforcing steel cord in accordance with the present invention. Three steel wires 1 are twisted to form a rubber reinforcing steel cord 10. The number of steel wires 1 to be twisted is not limited to three.

The method of manufacturing a rubber reinforcing steel cord in accordance with the present invention includes the application step of applying oil containing a cobalt compound to a steel wire plated with metal containing copper, and the step of twisting the thus prepared steel wires.

In the application step, oil containing a cobalt compound is applied to at least one steel wire. More specifically, before twisting the steel cord, in order to improve workability in twisting, generally, oil is applied to at least one of the steel wires. Here, cobalt compound is added to the oil, and the oil containing the cobalt compound is applied to the steel wire. The oil, however, may be applied after the step of twisting the steel wires.

Figure 3:
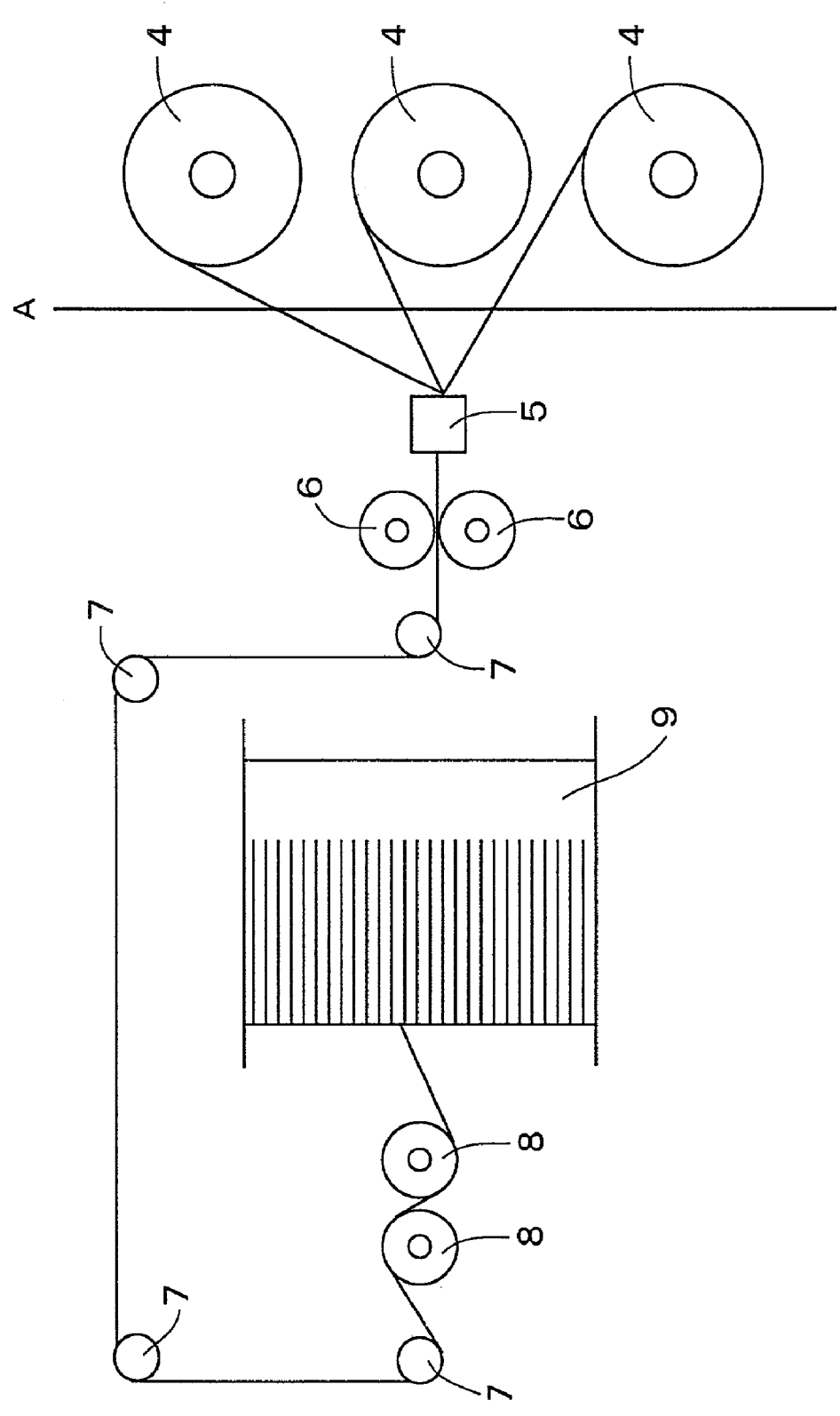
FIG. 3 is an illustration representing the process for manufacturing the steel cord in accordance with the present invention.

FIG. 3 illustrates the process for manufacturing the rubber reinforcing steel cord in accordance with the present invention. In the present invention, the steel cord refers to a cord provided by twisting one or more steel wires. There are three supply rolls 4, on each of which a steel wire is provided. On a passage line A from supply roll 4 to a drum 5, oil containing a cobalt compound is applied to at least one steel wire. At drum 5, three steel wires are twisted to form the steel cord. Thereafter, the steel cord passes through drums 6, 7 and 8, and taken up by a take-up drum 9.

As the method of applying oil containing a cobalt compound to a steel wire, dipping, spraying, or spreading may be used. The oil may be applied after the steel wires are twisted.

In the pneumatic tire in accordance with the present invention, the rubber reinforcing steel cord of the present invention is used as a reinforcing element. The rubber reinforcing steel cord of the present invention may be used at any portion where the reinforcing element is used. For example, it may be used for a carcass, a band layer, or a belt layer.

EXAMPLES

Example 1

A steel wire that has been drawn to have the diameter of 0.27 mm was plated with brass containing 63 mass % of copper and 37 mass % of zinc, and a mineral oil containing 0.6 mass % of cobalt naphthenate was sprayed thereto. Then, three thus prepared steel wires were twisted and a steel cord was fabricated. As the mineral oil, SANSEN 310 sold by Sanoil Corporation was used.

A rubber composition containing the additive agents listed in Table 1 was used as coating rubber for the steel cord.

TABLE 1

| Added Agents | Parts by Mass |
| --- | --- |
| Natural Rubber (NR) | 100 |
| Carbon Black (HAF) | 60 |
| Zinc White | 8 |
| Antioxidant (*1) | 2 |
| Mineral Oil | 2 |
| Vulcanization Accelerator (*2) | 1 |
| Sulfur | 5 |
| Cobalt Naphthenate | 0 |

*1 2,2,4-trimethyl-1, 2-dihydroquinoline copolymer
*2 DZ: N,N'-dicyclohexyl-2-benzothiazolyl sulfenamide The steel cord was coated with the rubber composition mentioned above, vulcanized at a temperature condition of 165° C. for 18 minutes, to form a sample for wet-heat adhesion. Thereafter, the thus formed wet-heat adhesion sample was left in an oven at 80° C. having relative moisture of 95% for 120 hours, and peeling test was conducted. The peeling test was also performed after the fabricated wet-heat adhesion sample was left for 0 hour.

The results of the peeling test are given as numerical values to the tenth place, in accordance with the evaluation reference below.

5 Fully coated with rubber and plated surface of steel cord is not visible
4 3 to 6 portions of plated surface of steel cord visible
3 13 to 20 portions of plated surface of steel cord visible
2 13 or more portions of plated surface of steel cord visible, while at least 60% of the overall body is coated with rubber
1 Less than 30% of steel cord coated with rubber The result of the peeling test in accordance with Example 1 is as shown in Table 3.

Example 2

Example 2 was prepared under the same condition as Example 1, except that mineral oil containing 1.0 mass % of cobalt naphthenate was sprayed to the steel cord. The result of peeling test in accordance with Example 2 is as shown in Table 3.

Comparative Example 1

Comparative Example 1 was prepared under the same condition as Example 0.1, except that mineral oil not containing cobalt naphthenate was sprayed to the steel cord, and rubber containing additive agents listed in Table 2 below was used as the rubber compositions to be adhered to the steel cord. The result of peeling test of Comparative Example 1 is also shown in Table 3.

TABLE 2

| Added Agents | Parts by Mass |
| --- | --- |
| Natural Rubber (NR) | 100 |
| Carbon Black (HAF) | 60 |
| Zinc White | 8 |
| Antioxidant (*1) | 2 |
| Mineral Oil | 2 |
| Vulcanization Accelerator (*2) | 1 |
| Sulfur | 5 |
| Cobalt Naphthenate | 1 |

The steel cord fabricated as Comparative Example 1 was embedded in the rubber shown in Table 1, and a belt layer was fabricated. Similarly, the steel cord fabricated as Example 2 was coated with the rubber composition shown in Table 1, and a belt layer was fabricated.

Using respective belt layers, tire samples were formed, and high speed running endurance of the tires was evaluated. The conditions for forming the tire samples were as follows.

Carcass: one ply of 1670 dtex/2 polyester (50 ends)
Cord angle with respect to circumferential direction 90°
Belt layer: 2 steel cords (40 ends)
Cord angle with respect to circumferential direction +20°, −20°
Tire size 195165R15

Here, "ends" refers to the number of embedded cords per every 5 cm of the ply.

The high speed running endurance test was performed under the following conditions. A drum tester was used, ambient temperature was adjusted to 25±5° C., the tire samples were mounted on rims, and the running speed was increased from 170 km/h stepwise by 10 km/h at every 10 minutes with inner pressure of 280 kPa and the load of 492 kgf, and the running was continued until the tire failed. The running distance until failure was indicated as an index, with Comparative Example 1 being the reference, 100. The larger index value means better high speed running durability. The test results are as shown in Table 3.

TABLE 3

| | | Comparative Example 1 | Example 1 | Example 2 |
|---|---|---|---|---|
| Belt Layer | Diameter of Steel Wire (mm) | 0.27 | 0.27 | 0.27 |
| | Twisted Steel Cord | 1 × 3 × 0.27 | 1 × 3 × 0.27 | 1 × 3 × 0.27 |
| | Content of Cobalt Naphthenate in Oil (mass %) | 0 | 0.6 | 1 |
| | Content of Cobalt Naphthenate in Rubber Mixture (mass %) | 0.56 | 0 | 0 |
| Physical Property | Result of Peeling Test (80° C. - relative moisture of 95%, 0 hour) | 4.3 | 4.4 | 4.5 |
| | Result of Peeling Test (80° C. - relative moisture of 95%, 120 hours) | 3.6 | 3.7 | 3.9 |
| | Result of High Speed Running Endurance Test | 100 | — | 103 |

From the results of the peeling test, it is understood that the rubber reinforcing steel cord in accordance with the present invention has good adhesion with rubber. From the results of high speed running endurance test, it is found that the pneumatic tire using the rubber reinforcing steel cord of the present invention has superior durability. In Table 3, the twisted steel cord of 1×3×0.27 refers to a steel cord prepared by twisting three steel wires each having the diameter of 0.27 mm.

The steel cord in accordance with the present invention adopts a unique structure that is formed by twisting steel wires each plated with metal containing copper and having its surface coated with oil containing a cobalt compound. By such a structure, adhesion with rubber is improved. Further, the pneumatic tire using the steel cord in accordance with the present invention is economical and has superior durability.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rubber reinforcing steel cord, having a steel wire plated with metal containing copper and having oil containing a cobalt compound on a surface thereof, wherein the concentration of the cobalt compound in the oil is 0.3 to 10.0 mass percent.

2. The rubber reinforcing steel cord according to claim 1, wherein said oil is mineral oil.

3. The rubber reinforcing steel cord according to claim 1, wherein said cobalt compound is selected from the group consisting of cobalt stearate, cobalt naphthenate, cobalt oleate, cobalt linoleate, and rosin cobalt.

4. The rubber reinforcing steel cord according to claim 3, wherein said oil is mineral oil.

5. The rubber reinforcing steel cord according to claim 1, wherein the cobalt compound is cobalt naphthenate.

6. A pneumatic tire containing the rubber reinforcing steel cord according to claim 1 as a reinforcing element.

7. The pneumatic tire according to claim 6, wherein said oil is mineral oil.

8. The pneumatic tire according to claim 6, wherein the cobalt compound is selected from the group consisting of cobalt stearate, cobalt naphthenate, cobalt oleate, cobalt linoleate, and rosin cobalt.

9. The pneumatic tire according to claim 6, wherein the cobalt compound is cobalt naphthenate.

10. A pneumatic tire comprising rubber-based structural elements and a reinforcing steel cord formed from a treated steel wire as a reinforcing element, wherein the treated steel wire consists essentially of a steel wire plated with metal containing copper having applied on the surface thereof an oil containing a cobalt compound, wherein the concentration of the cobalt compound in the oil is 0.3 to 10.00 mass percent.

11. The pneumatic tire according to claim 10, wherein said cobalt compound is selected from the group consisting of cobalt stearate, cobalt naphthenate, cobalt oleate, cobalt linoleate, and rosin cobalt.

12. A method of manufacturing a rubber reinforcing steel cord, comprising:

the application step of applying oil containing a cobalt compound to a steel wire plated with metal containing copper, wherein the concentration of the cobalt compound in the oil is 0.3 to 10.0 mass percent, and the step of twisting at least one of said steel wires.

13. The method according to claim 12, wherein said oil is mineral oil.

14. The method according to claim 12, wherein said cobalt compound is selected from the group consisting of cobalt stearate, cobalt naphthenate, cobalt oleate, cobalt linoleate, and rosin cobalt.

15. The method according to claim 12, wherein the cobalt compound is cobalt naphthenate.

16. A method of manufacturing a pneumatic tire which comprises:

applying an oil composition to a steel wire plated with metal containing copper after all drawing operations performed on the steel wire to form a treated steel wire, wherein the oil composition consists essentially of oil and a cobalt compound, and wherein the concentration of the cobalt compound in the oil is 0.3 to 10.0 mass percent; and incorporating the treated steel wire into a pneumatic tire as a reinforcing element.

17. The method of claim 16, wherein said cobalt compound is selected from the group consisting of cobalt stearate, cobalt naphthenate, cobalt oleate, cobalt linoleate, and rosin cobalt.

* * * * *